Aug. 18, 1931.  W. C. DE GRAFF  1,819,837
CHUCK
Filed April 9, 1928    3 Sheets-Sheet 3
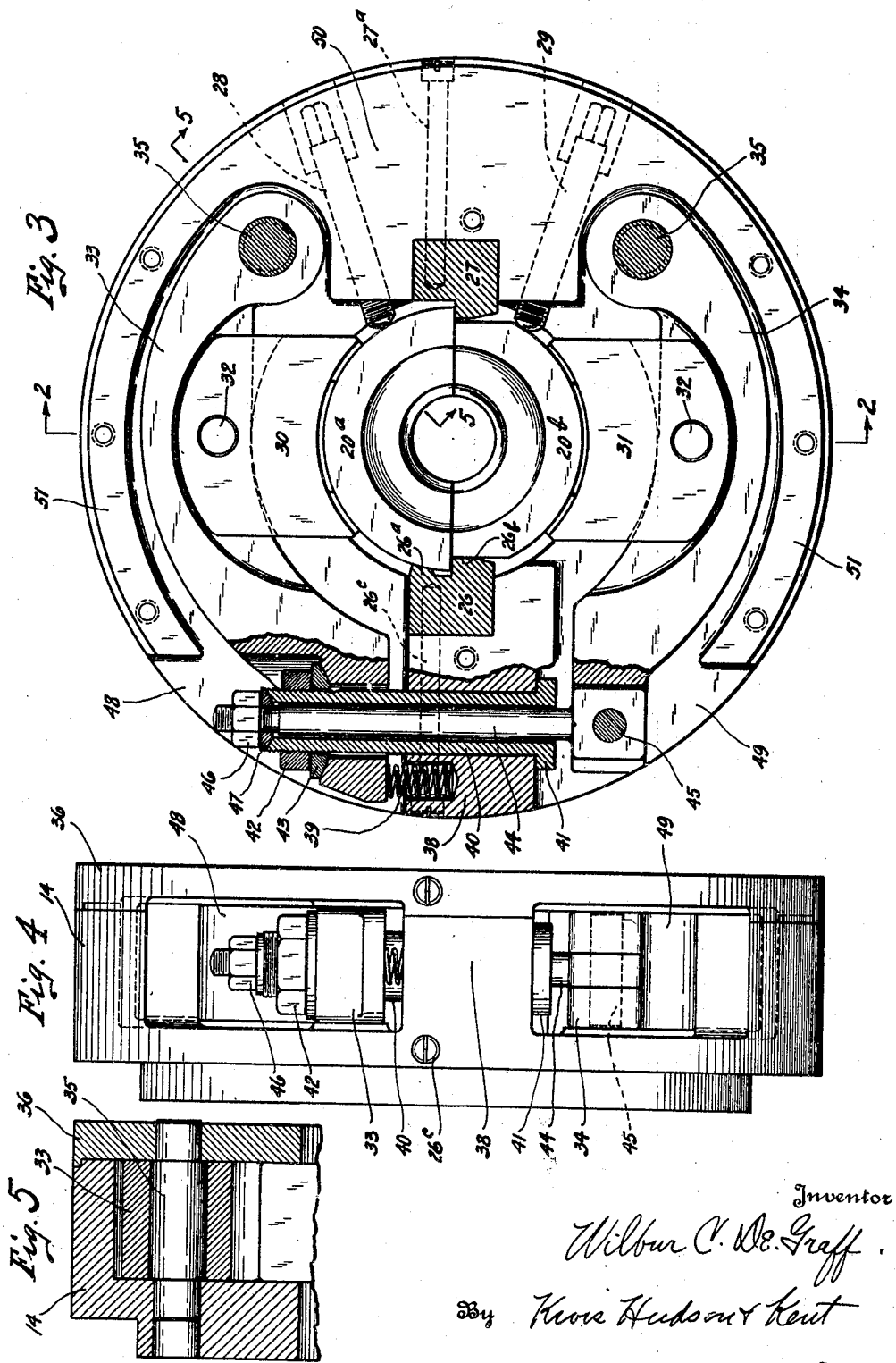
Inventor
Wilbur C. De Graff.
By Kwis Hudson & Kent
Attorneys Patented Aug. 18, 1931

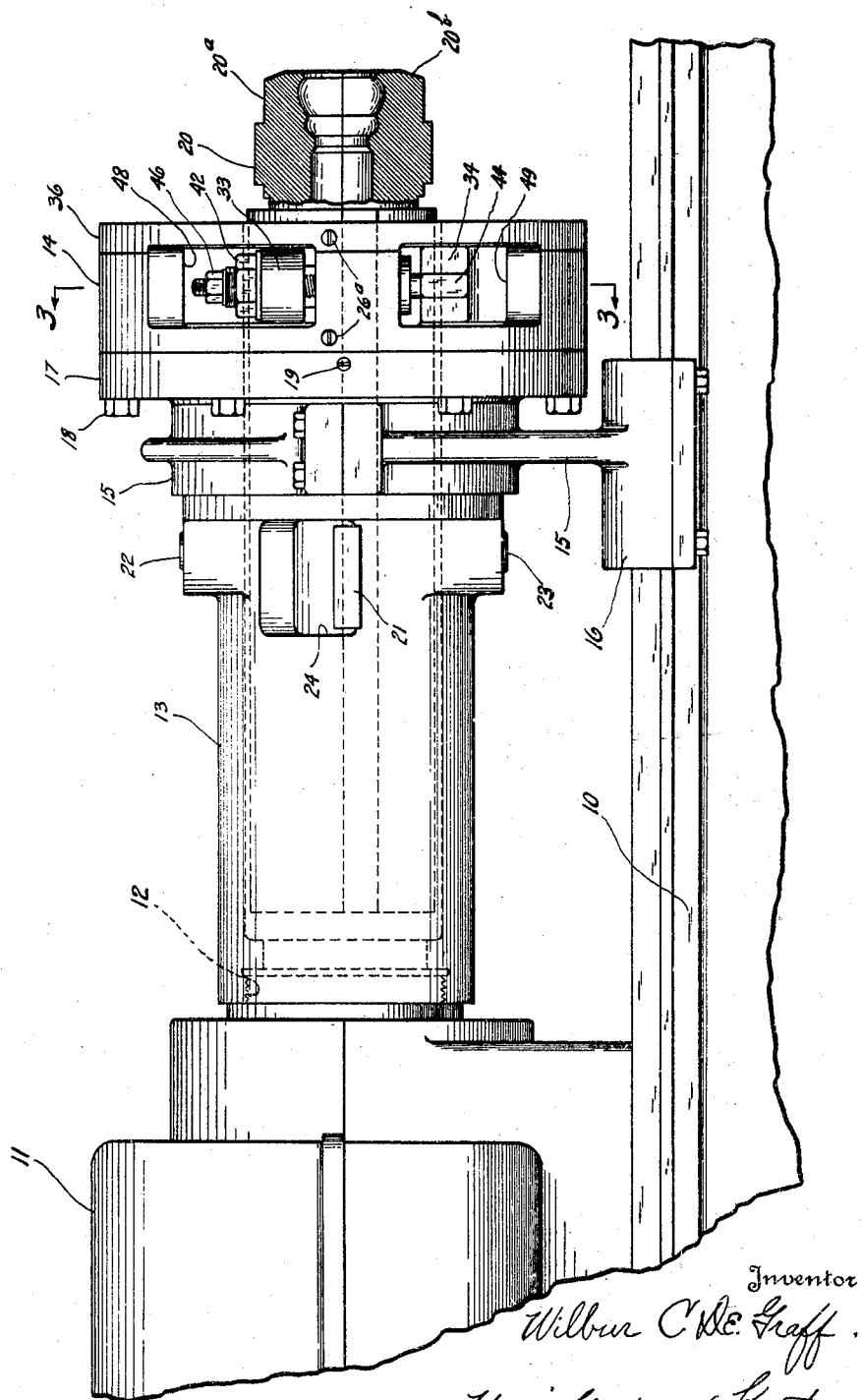

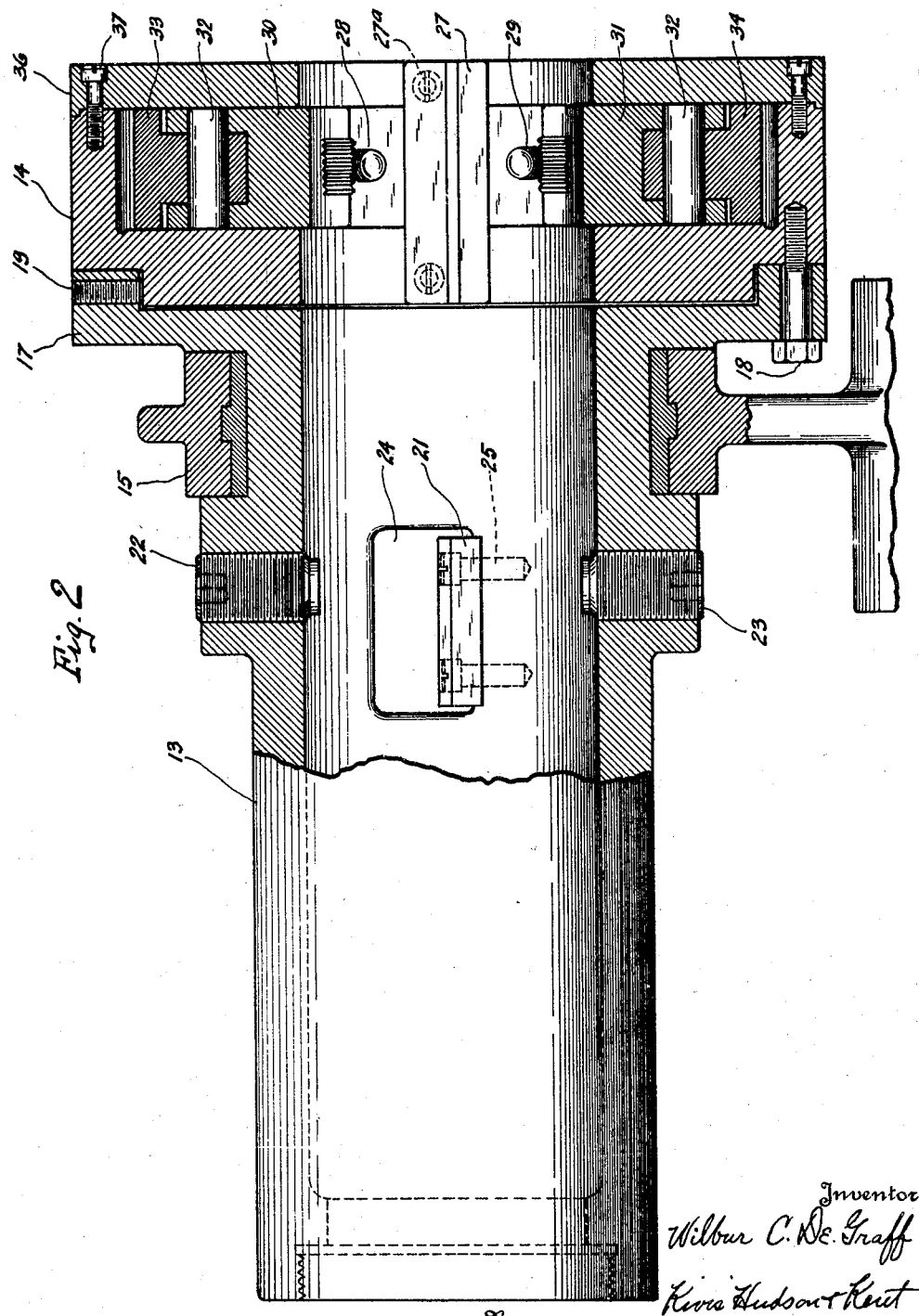

1,819,837

UNITED STATES PATENT OFFICE

WILBUR C. DE GRAFF, OF CLEVELAND, OHIO, ASSIGNOR TO THE WARNER & SWASEY COMPANY, OF CLEVELAND, OHIO, A CORPORATION OF OHIO

CHUCK

Application filed April 9, 1928. Serial No. 268,448.

This invention relates to chucks and has particular reference to a chuck for supporting long work pieces formed in two halves, the two halves being adapted to be clamped together and to be supported by the chuck so that they may be machined simultaneously as a unit. The invention has special utility, for example, in forming so-called neck rings for bottle molds, these being generally formed from two long bars or castings which are adapted to be clamped together and supported in the chuck centrally of the axis of rotation with the forward end of the unit projecting from the front of the chuck. In practice, the forward end is machined to the proper contour and bore and then cut off to form one neck ring. Then the bars are released, moved forwardly, reclamped, and again supported in the chuck and then the machining operation is repeated, this being continued until the whole work unit is used up.

It is the principal object of the present invention to provide a chuck construction by which the two work pieces forming the unit to be machined may be easily and quickly clamped together and securely held in centered position in the chuck. More particularly, it is the aim of the invention to provide a special clamping and supporting structure at the front of the chuck and to make it possible for the operator to clamp the two pieces together and to center them, with adjusting means located at one point, thereby making it unnecessary for him to move about from one side of the machine to the other or to rotate the chuck to bring the adjusting members to a point where they can be conveniently manipulated, as is necessary if these adjusting members are located on the chuck body at widely spaced points.

Another object is to provide a chuck which is capable of holding and centering a long bar consisting of two halves and to hold said halves clamped together with the adjoining surfaces axially of the chuck and centered as to their contour.

The invention may be briefly summarized as consisting in certain novel combinations and arrangements of parts and details of construction which will be described in the specification and set forth in the appended claims.

In the accompanying sheets of drawings, wherein I have illustrated the preferred embodiment of the invention, Fig. 1 shows a portion of a lathe equipped with my improved chuck to which has been applied a work piece or unit such as referred to herein, the forward end of the latter being in section to show how it is machined before being cut off to form a complete neck ring; Fig. 2 is a detached, enlarged, longitudinal sectional view of the chuck partly in elevation, the section being taken substantially on the line 2—2 of Fig. 3; Fig. 3 is a view on the same scale as Fig. 2 partly in front elevation with the front plate removed and partly in transverse section, the section being taken substantially along the line 3—3 of Fig. 1; Fig. 4 is a detached view on the same scale as Figs. 2 and 3, showing detached and in side elevation the removable front unit forming a part of the chuck body when applied to a rear unit; and Fig. 5 is a detail sectional view on the line 5—5 of Fig. 3.

Referring now to the drawings, 10 represents the bed of a lathe which is provided with a head 11 having a suitably driven spindle the front end of which is shown by dotted lines at 12. Adapted to be connected to the spindle 12 is a chuck which in this case, in order that it may accommodate long work pieces of the type referred to, has considerable length. Accordingly, the chuck body, as here illustrated, is composed of two units comprising a rear unit 13 and a front unit 14 which is adapted in the manner hereinafter explained to be detachably connected to the front end of the rear unit 13.

The rear unit 13 is a sleeve-like member, the rear end of which is adapted to be screwed onto the spindle 12, and in view of its length the forward end of this unit is preferably supported by a so-called steady-rest 15, this steady-rest being supported on the ways of the bed and being designed to be clamped thereto by foot portions indicated at 16 in Fig. 1 and having an annular bearing in which the forward portion of the unit 13 is adapted to freely rotate, see Fig. 2. For convenience of assembly, the steady-rest is made in two parts which are clamped together preferably on the center line of the chuck, as clearly indicated in Fig. 1.

The rear unit 13 is provided at its front end with an outwardly extending flanged portion 17 against which the forward unit 14 is clamped by a number of clamping screws 18. The flanged front end of the rear unit is inset somewhat a short distance inside its periphery and a boss-like extension on the rear side of the front unit is received in the inset portion with a clearance which will enable the front member to be exactly centered with respect to the rear member by a series of adjusting screws 19, four of which may be used at equally spaced points. The screws 18 pass through slightly elongated openings in the flanged portion 17 so as to enable the front member to be adjusted to the right position before these screws are tightened.

At this point I might state that the work piece or work unit designated 20 is composed of two parts 20a and 20b having faces designed to be clamped together on a diametrical plane. This unit 20, as shown in Fig. 1, extends through both chuck units 13 and 14 to near the end of the rear unit. That is to say, it will have this length before the first finished section is cut off at the front end. As stated above, in the machining operation the front end which projects beyond the chuck, is machined internally and externally to the right contour and then the machined portion is cut off, the cut off portion being substantially that which is shown in section in Fig. 1, after which the work unit is released, moved forward, and reclamped and centered. In view of the length of this piece it is desirable that it be supported in both the units 13 and 14 of the chuck. To support it in the rear unit, the latter is provided just rearwardly of the steady-rest with a pair of rails 21 which are diametrically opposite each other. The upper member 20a of the work unit is provided with diametrically opposite portions which project at the meeting faces of the two members of the unit beyond adjacent portions of the other member. This is generally accomplished when the members are cast or otherwise formed by notching opposite sides of the unit designated 20b for its full length adjacent the flat face which is to bear against the companion flat face of the member 20a. The upper member is, by reason of the projecting portions, arranged to rest upon the rails 21, and it is clamped down against these rails by an upper set-screw 22. The lower member 20b is then clamped up against the upper member 20a and is so held by a lower set-screw 23. Openings 24 are provided adjacent the rails 21 to permit these rails to be secured in place by means of set-screws 25 and also to enable the workman to see that the work unit 20 is properly positioned in the rear chuck unit 13 when the parts are being clamped together onto the rails.

In addition to the means for supporting the work unit in the rear chuck unit 13, I provide supporting rails in the front chuck unit 14 and improved means for clamping the parts onto these rails against each other in the front unit 14. The rails carried by the front unit 14 are designated 26 and 27, these being held in place by screws 36c and 27a. The upper member 20a of the work unit is adapted to rest on these rails, the same as on the rear rails 21, and in positioning or centering the work unit the upper member is caused to engage a shoulder 26a of the rail 26 and is pressed against the same by a radially disposed screw 28. The lower member 20b is pressed against a second shoulder 26b of the rail 26 by a similar radially disposed screw 29 so as to center the same.

In addition to the work supporting rails and the two clamping screws referred to, the parts more directly involving my invention are provided to tightly clamp the upper half of the work piece 20a on the rails and the opposite flat faces of the two work pieces together. This improved means includes two clamping jaws 30 and 31, these being arranged diametrically opposite each other, the former being adapted to clamp against or engage the member 20a of the work unit and the jaw 31 being adapted to clamp against or engage the member 20b of the work unit, as clearly shown in Fig. 3. These two jaws are pivotally connected by pins 32 to a pair of levers 33 and 34 which are pivoted on bearing pins 35 carried by the front chuck unit 14. For convenience of assembly, the body of the front chuck unit is composed of a main rear portion and a removable front plate 36 which is secured by screws 37 to a forwardly projecting flange of said main or body portion. The front face of said main rear portion is recessed to provide clearance for the levers 33 and 34 and the jaws 30 and 31 and the pins 35 bridge the recess and are supported in both the rear portion and front plate 36 of the front chuck unit, see Fig. 5. The recess has an irregular shape which will be described. By referring to Fig. 2 it will be noted that portions of the levers 33 and 34 have interfitting engagement or connection with the clamping jaws 30 and 31, the levers at these points being substantially T-shaped and the clamping jaws being substantially U-shaped, forming interfitting tongues and grooves through which the pivot pins 32 extend.

It will be apparent that if the levers 33 and 34 are moved inwardly toward the center of the chuck, the clamping jaws 30 and 31 are moved into clamping engagement with the work unit and that if the levers are swung outwardly the jaws are released from the work unit. It is a feature of the present invention that these clamping levers 33 and 34 have actuating means to shift them so as to clamp or release the jaws 30 and 31, which actuating means are located adjacent each other at one point in the periphery of the front chuck unit. This is accomplished by the following means. It will be noted that the pivot pins 35 for the levers 33 and 34 are on one side of the vertical plane of the chuck as the same is viewed in Fig. 3 and that the levers extend from these pivot pins to the opposite side, these levers terminating on opposite sides of an extension 38 projecting forwardly from the rear wall or body of the front chuck unit 14. Between the free end of the lever 33 and this extension 38 is a coil spring 39 which the free end of the said lever engages, the spring being seated in a socket of the extension 38. Projecting through the extension is a sleeve 40 provided at one end with a shoulder 41 engaging one side of the extension. The opposite end of the sleeve is threaded externally and is engaged by a nut 42 engaging a washer 43 having a spherical shaped inner side engaging a spherical seat formed on the adjacent face of the free end of lever 33. It will be seen, therefore, that the lever 33 can be rocked inward by tightening the nut 42, thus moving the jaw 30 into clamping engagement with the work piece 20a, and when the nut 42 is released the spring 39 will shift the lever in the opposite direction so as to release the jaw 30 from the work unit.

The free end of the lever 34 has attached thereto a bolt 44 which is pivoted to the lever by a pin 45. This lever extends through the sleeve 40 and at the outer end of the bolt there is provided a nut 46, and between the nut and the top of the sleeve there is a washer 47 having a spherical face engaging a spherical seat at the top of the sleeve. Obviously, when the nut 46 is tightened the lever 34 is rocked inwardly, bringing the jaw 31 into clamping engagement with the member 20b of the work unit, and when the nut is released, the lever will swing outwardly, releasing the jaw 31 from the work piece. It will be noted that the nut 42 for actuating the lever 33 and the nut 46 for actuating the lever 34 are in this instance located closed together or at the same point in the periphery of the chuck and the operator has only to position the chuck so that the point of access to these two nuts is in front of him or at the front side of the machine to enable him to actuate both these levers without changing his position. The peripheral part of the front chuck unit 14 has two openings designated 48 and 49, which openings are arranged on opposite sides of the extension 38. The opening 48 gives access to the nuts 42 and 46 and the other opening 49 provides the necessary clearance for the free swinging movement of lever 34. These openings which are clearly indicated in Figs. 3 and 4 lead into a part of the recess which is provided in the body of the front unit to accommodate the levers 33 and 34 and the jaws 30 and 31. The recess or contour of the front face of the body of the front chuck unit will be apparent from Fig. 3 wherein it will be observed that the extension 38 in addition to forming the abutment for the spring 39 and end of sleeve 40 supports the rail 26. A second extension 50 somewhat wider than the extension 38 and diametrically opposite thereto supports the rail 27 as well as constituting the support for the radially disposed screws 27a, 28 and 29. From the extension 50, wing-like segmental peripheral extensions 51 project toward the extension 38 and terminate far enough therefrom to form the windows 48 and 49, these extensions 51 projecting over the levers 33 and 34 for substantially their entire length so that when the front cover 36 is applied, the levers 33 and 34 and associated parts are completely housed except at the windows 48 and 49.

The bolt 44 has a certain clearance in the sleeve 40 so that it may rock somewhat as the lever 34 swings from inoperative position, to operative position, and vice versa. Additionally, it might be stated that the spherical seat of the washer 43 on the lever 33 and the spherical seat of the washer 47 on the end of the bushing 40 are provided to allow the parts to adjust themselves to the rocking motion incident to the swinging of the levers 33 and 34.

It will be noted, therefore, that by the provision of these levers pivoted on one side of the center of the chuck with their free ends on the opposite side of the center and both levers adjustable through the actuation of two closely associated members accessible at one point or at one opening in the periphery of the chuck, the clamping or releasing of both halves or parts of the work piece in so far as the jaws 30 and 31 are concerned can be accomplished without turning the chuck and without making it necessary for the operator to change his position.

It will be apparent also that the entire front unit may be removed and replaced with another adapted for gripping work pieces of other diameters.

While I have shown the preferred construction, I do not desire to be confined to the precise details shown but aim in my claims to cover all modifications which do not involve a departure from the spirit and scope of my invention.

Having thus described my invention, I claim:

1. A chuck comprising a chuck body having a plurality of oppositely disposed independently movable clamping members, and means for actuating them located at one side of the chuck and accessible at one part of the body of the chuck.

2. In a chuck, a chuck body having a plurality of independently movable oppositely disposed clamping members, and a pair of adjacent actuating members for said clamping members, said actuating members being located at one side of the chuck and being both accessible at one part of the body of the chuck.

3. A chuck comprising a chuck body, a pair of oppositely disposed independently movable clamping members, and a pair of actuating members for said clamping members located adjacent each other at one side of the chuck and accessible at one part of the chuck body.

4. A chuck comprising a chuck body, a pair of oppositely disposed clamping jaws movable substantially radially, and means for independently actuating the jaws comprising a pair of adjacent actuating members located at one side of the chuck and accessible at the same part of the chuck body.

5. In a chuck, a chuck body, and means for clamping the work therein comprising a plurality of oppositely disposed independently movable clamping levers and a pair of actuating members therefor located at one side of the chuck and accessible at the same part of the chuck body.

6. In a chuck, a chuck body, a pair of oppositely disposed clamping jaws, a pair of levers carrying them, and a pair of adjacent members located at one side of the chuck and accessible at one part of the chuck body for rocking said levers.

7. In a chuck, a chuck body, a pair of oppositely disposed independently movable clamping jaws, a pair of levers pivoted on one side of the axis of rotation carrying said jaws and having their free ends on the opposite side of the axis of rotation, and a pair of adjacent members accessible at one and the same part of the chuck body for rocking the levers.

8. In a chuck, a chuck body, means for clamping the work comprising a pair of clamping levers, and means for actuating the levers comprising a pair of clamping nuts and members engaged by the nuts and one extending through the other.

9. In a chuck, a chuck body, a pair of clamping members mounted on one side of the axis of rotation and having their free ends on the opposite side, and means for shifting said clamping members into work clamping position comprising a pair of relatively movable threaded members one having operative connection with the free end of one clamping member, and a pair of relatively movable threaded members one having operative connection with the free end of the other clamping member, said members being accessible at one part of the chuck body.

10. In a chuck, a chuck body, a pair of clamping members mounted on one side of the axis of rotation and having their free ends on the opposite side, and means for shifting said clamping members into work clamping position comprising a pair of relatively movable threaded members one having operative connection with the free end of one clamping member, and a pair of relatively movable threaded members one having operative connection with the free end of the other clamping member, one of said members being hollow and another extending therethrough.

11. A chuck comprising a chuck body having work supporting rails for a work piece in two parts having engaging faces, means for clamping one of the parts of the work piece against the rails and at the same time clamping them together comprising a pair of clamping members and a pair of actuating members operatively connected thereto and located adjacent each other at one side of the chuck and accessible at one part of the chuck body.

12. A chuck comprising an elongated body adapted to accommodate a long work piece in two halves, a pair of work supporting rails diametrically opposite each other, a pair of oppositely disposed clamping jaws for clamping one part of the work piece against the rails and for clamping the two parts of the work piece together, and actuating members for said jaws located adjacent each other at one side of the chuck and accessible at one part of the chuck body.

13. A chuck comprising a chuck body having an opening in its peripheral wall, a pair of oppositely disposed work supporting rails, a pair of clamping members for engaging two separate companion parts of the work piece and serving to clamp one of said parts against the rails and the two parts together, and a pair of actuating members for said clamping members and located adjacent each other and accessible through said opening and each when adjusted serving to shift a clamping member independently of the other.

14. A chuck comprising a rear chuck body having a pair of work supporting rails, a front chuck body secured to the rear chuck body and provided with work supporting rails and with two movable work clamping members independently movable and a pair of actuating members for the two clamping members located adjacent each other at one side of the chuck and accessible at one part of the front chuck body.

15. A machine tool having a bed, a head with a spindle, a chuck for supporting a long work piece comprising a rear chuck body connected at its rear end to the spindle, a steady-rest for supporting the forward end of the rear chuck body, a front chuck body attached to the forward end of the rear chuck body, both chuck bodies having work supporting rails and the front chuck body having a pair of work clamping members and actuating members therefor for independently shifting said clamping members and located adjacent each other at one side of the chuck and accessible at substantially the same part of the front chuck body.

16. A chuck for supporting a two-part work piece and for holding the parts in engagement with each other comprising a chuck body having a pair of spaced rails with faces upon which one of the parts of the work piece is adapted to be clamped, means for clamping the parts of the work piece together and for holding one of the parts against said faces, one of the rails having a locating shoulder in addition to the face referred to, and means separate from said clamping means for pressing one part of the work piece against said shoulder.

17. A chuck for supporting a two-part work piece with the two parts adapted to be held in engagement with each other, comprising a chuck body having a pair of spaced work supporting rails, the rails having a pair of faces onto which one of the work pieces is adapted to be held and one of the rails additionally having a pair of locating shoulders each adapted to be engaged by one part of the work piece, means for clamping the work pieces together and for pressing them against said faces, and means separate from said clamping means for pressing the two parts of the work piece against the shoulders of the rails.

In testimony whereof, I hereunto affix my signature.

WILBUR C. DE GRAFF.